United States Patent [19]
Kato et al.

[11] Patent Number: 5,099,387
[45] Date of Patent: Mar. 24, 1992

[54] MULTILAYER CAPACITOR

[75] Inventors: Noboru Kato; Emiko Nogome, both of Nagaokakyo, Japan

[73] Assignee: Murata Manufacturing Co., Ltd., Japan

[21] Appl. No.: 641,881

[22] Filed: Jan. 16, 1991

[30] Foreign Application Priority Data

Jan. 19, 1990 [JP] Japan .................. 2-11611

[51] Int. Cl.⁵ .............................. H01G 4/10
[52] U.S. Cl. .................................. 361/321
[58] Field of Search ............... 29/52.42; 361/320, 321, 361/311-313

[56] References Cited

U.S. PATENT DOCUMENTS

| | | | |
|---|---|---|---|
| 2,828,454 | 3/1958 | Khouri | 361/321 |
| 4,466,045 | 8/1984 | Coleman | 361/321 X |
| 4,573,101 | 2/1986 | Takeno | 361/321 |
| 4,916,582 | 4/1990 | Okamura et al. | 361/321 |

FOREIGN PATENT DOCUMENTS 2-156619 6/1990 Japan .

*Primary Examiner*—Donald A. Griffin
*Attorney, Agent, or Firm*—Ostrolenk, Faber, Gerb & Soffen

[57] ABSTRACT

A multilayer capacitor in which a plurality of inner electrodes are arranged so as to be overlapped with each other while being separated by dielectric layers, at least one of the inner electrodes being provided with a slit extending in the direction of a current flowing in the inner electrode and having a width which is two times or more as large as the thickness of the dielectric layer which is in contact with the inner electrode.

7 Claims, 6 Drawing Sheets

MULTILAYER CAPACITOR

BACKGROUND OF THE INVENTION

1. Field of the Invention

The present invention relates generally to multilayer capacitors, and more particularly, to a multilayer capacitor having high Q characteristics in a high frequency band of several tens MHz to several GHz.

2. Description of the Prior Art

In order to improve the performance of an electronic equipment, it is essential to improve Q characteristics of a multilayer capacitor in the above described high-frequency band.

Therefore, in the conventional multilayer capacitor, the Q characteristics are enhanced by decreasing a capacitance acquired by one dielectric layer and arranging a lot of dielectric layers in parallel to decrease ESR (equivalent series resistance) of an inner electrode.

Referring to FIGS. 6 to 10, the structures and the problems of the conventional multilayer capacitor will be described more concretely. A capacitor having a low capacitance of approximately 1 pF to 10 pF is taken as an example. In a multilayer capacitor 1 shown in FIG. 6, a pair of inner electrodes 3a and 3b is arranged so as to be partially overlapped with each other while being separated by a dielectric layer 2a inside of a dielectric body 2. The inner electrode 3a is electrically connected to an outer electrode 4b, while the inner electrode 3b is electrically connected to an outer electrode 4b. In this structure, it is possible to ensure a capacitance but it is difficult to enhance Q characteristics.

Accordingly, a multilayer capacitor 11 has been proposed in which more inner electrodes are arranged in a dielectric body 12, as shown in FIG. 7. In this multilayer capacitor 11, a plurality of inner electrodes 13a to 13e are arranged.

Furthermore, a multilayer capacitor 21 has been proposed in which the thickness of a dielectric layer 22a between inner electrodes 23a and 23b is increased, as shown in FIG. 8. Further, when it is desired to particularly enhance Q characteristics, a structure has been proposed in which the number of inner electrodes is increased and some of the inner electrodes are constructed as so-called double electrodes 33a and 33b, as shown in FIG. 9. That is, a multilayer capacitor in which an inner electrode 13c in the multilayer capacitor 11 shown in FIG. 7 is of double electrode construction corresponds to a multilayer capacitor 31 shown in FIG. 9. 33c to 33f also denote inner electrodes.

However, the ESR is small in a low frequency region while being large in a high frequency region. More specifically, the increase of eddy currents 42 and 43 produced when a current flows in an inner electrode 41 in the direction of an arrow I, as shown in FIG. 10, causes the ESR to be increased. As a result, in the above described conventional multilayer capacitors 11, 21 and 31, sufficiently high Q characteristics cannot be achieved.

SUMMARY OF THE INVENTION

Accordingly, an object of the present invention is to provide a multilayer capacitor having a structure in which ESR can be decreased also in a high frequency region, thereby to make it possible to enhance Q characteristics.

According to the present invention, there is provided a multilayer capacitor comprising a dielectric body, a plurality of inner electrodes arranged so as to be partially overlapped with each other while being separated by dielectric layers in the dielectric body, and outer electrodes formed in a pair of end surfaces of the dielectric body and electrically connected to predetermined inner electrodes, at least one of the plurality of inner electrodes being provided with a slit extending in the direction of a current flowing in the inner electrode and having a width which is two times or more as large as the thickness of the above dielectric layer which is in contact with the inner electrode.

In the present invention, the inner electrode is divided into two parts in the direction of width by the above slit, so that a current flows in a blanched manner. Consequently, the eddy currents produced with the blanched currents become smaller than the eddy currents produced in the inner electrode in the conventional multilayer capacitor. Moreover, the width of the slit is set to two times or more as large as the thickness of the dielectric layer which is in contact with the inner electrode. Accordingly, the ESR can be made considerably smaller also in the high frequency region, thereby to make it possible to enhance the Q characteristics of the multilayer capacitor.

Additionally, the dielectric layers which support the inner electrode provided with the slit with it being interposed therebetween are directly joined through the slit portion. Accordingly, the adhesive strength of the dielectric layers is increased, thereby to make it also possible to restrain the occurrence of delamination.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
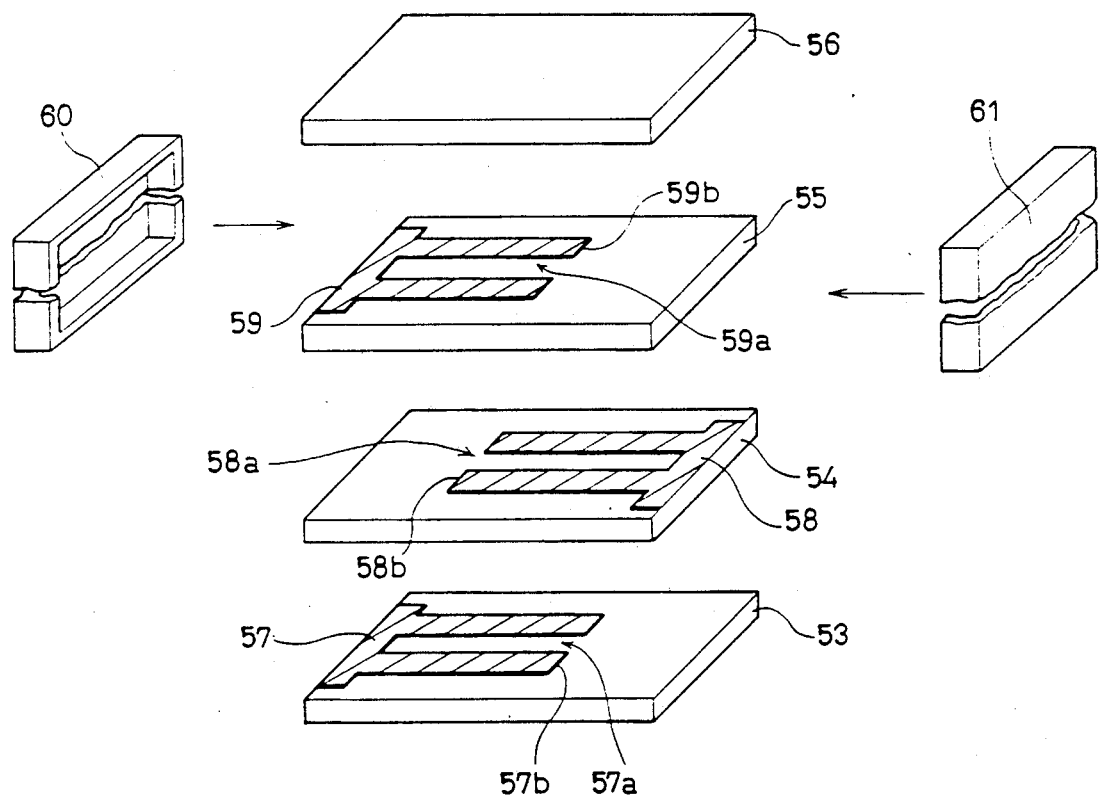
FIG. 1 is a typical exploded perspective view for explaining a multilayer capacitor according to one embodiment of the present invention.
Figure 2:
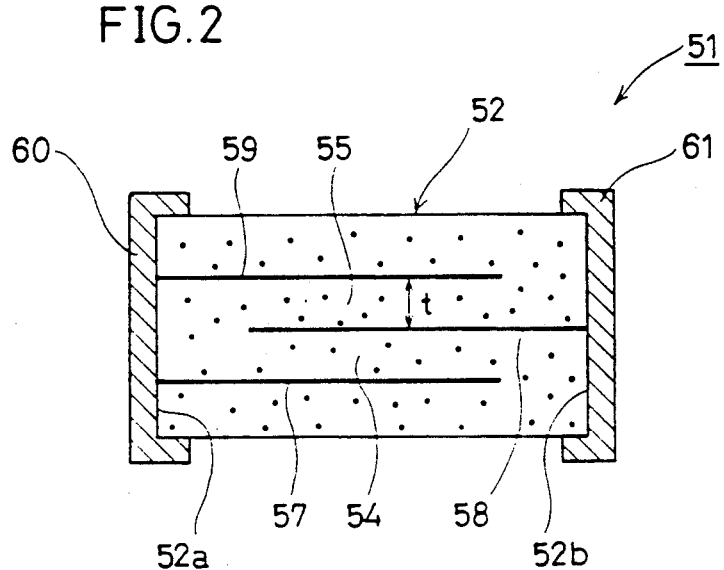
FIG. 2 is a sectional side elevation view showing a multilayer capacitor according to the embodiment.

FIG. 1 is a typical exploded perspective view for explaining a multilayer capacitor according to one embodiment of the present invention, and FIG. 2 is a sectional side elevation view showing the multilayer capacitor shown in FIG. 1.

In a multilayer capacitor 51 according to the present embodiment shown in FIG. 2 is constructed using a monolithic type dielectric body 52. The monolithic type dielectric body 52 has a structure in which four dielectric layers 53 to 56 are laminated, as shown in FIG. 1. Inner electrodes 57 to 59 are respectively formed on upper surfaces of the dielectric layers 53 to 55.

More specifically, the above described dielectric body 52 is obtained by printing conductive paste for forming an inner electrode on a ceramic green sheet and laminating a predetermined number of ceramic green sheets having conductive paste printed thereon, followed by cofiring.

The inner electrodes 57 to 59 are formed so as to be overlapped with each other in the direction of thickness while being separated by the dielectric layers 54 and 55 in a central region of the dielectric body 52. The inner electrodes 57 and 59 are led out to one end surface 52a of the dielectric body 52, while the inner electrode 58 is led out to the other end surface 52b thereof. Furthermore, outer electrodes 60 and 61 are respectively formed on the end surfaces 52a and 52b. The outer electrodes 60 and 61 are respectively formed by applying conductive paste to the end surfaces 52a and 52b of the dielectric body 52 to bake the same or a suitable thin film forming process such as plating.

In the multilayer capacitor 51, capacitances are taken out between the inner electrodes 57 to 59 which are overlapped with each other while being separated by the dielectric layers 54 and 55.

The multilayer capacitor 51 according to the present embodiment is characterized in that slits 57a to 59a are respectively formed in central parts of the inner electrodes 57 to 59 in the direction of width. The slits 57a to 59a are formed so as to extend in the longitudinal direction of the respective inner electrodes 57 to 59, that is, the direction in which a current flows when they are used as capacitors. In addition, the slits 57a to 59a are formed from top ends 57b to 59b of the respective inner electrodes 57 to 59 so as not to lead to ends, which are connected to the outer electrode 60 or 61, of the inner electrodes.

Figure 3:
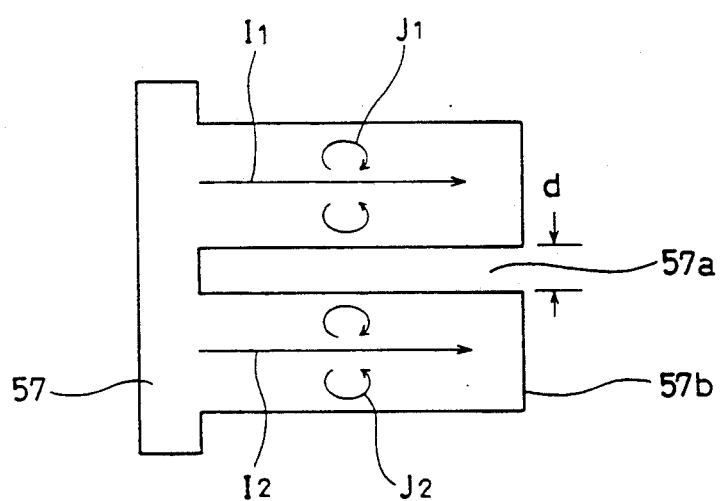
FIG. 3 is a plan view showing an inner electrode provided with a slit.

As the slit 57a is typically shown in FIG. 3, the width d of each of the slits 57a to 59a is selected so as to satysfy $d \geq 2t$ with respect to the thickness t of the dielectric layer 53 or 54 constituting a capacitor portion.

Figure 4:
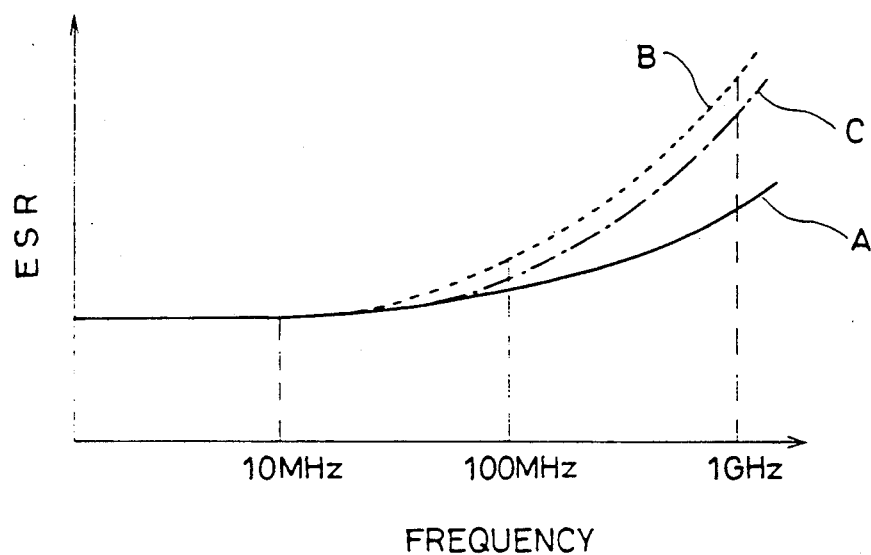
FIG. 4 is a diagram showing ESR-frequency characteristics of inner electrodes of a multilayer capacitor according to the embodiment and a multilayer capacitor in the conventional example.

ESR-frequency characteristics of the multilayer capacitor according to the present embodiment which is constructed in the above described manner are represented by a solid line A in FIG. 4. For comparison, characteristics of the conventional multilayer capacitor constructed in the same manner as that in the above described embodiment except that the slits 57 to 59 are not formed are represented by a broken line B. Furthermore, characteristics of a multilayer capacitor in a comparative example in which the slits 57a to 59a are formed but the width of each of the slits is selected so as to satisfy $d < 2t$ are represented by a one dot and dash line C. The concrete dimensions of the multilayer capacitors in which the characteristics shown in FIG. 4 are determined are as follows. In the multilayer capacitor according to the present embodiment, the width d of the slit is 100 mm, the width of one of the inner electrode portions on both sides of the slit is 300 mm, and the thickness t of the dielectric layer is 20 mm. In the conventional multilayer capacitor having the characteristics represented by the broken line B, the width of the inner electrode is 600 mm. In the multilayer capacitor in the comparative example having the characteristics represented by the one dot and dash line C, the width d of the slit is 100 mm, the width of one of the inner electrode portions on both sides of the slit is 300 mm, and the thickness t of the dielectric layer is 100 mm.

As obvious from FIG. 4, the ESR in the multilayer capacitor in the comparative example (having the characteristics represented by the one dot and dash line C) is smaller than that in the multilayer capacitor provided with no slits (having the characteristics represented by the broken line B). However, the effect of reducing a value of ESR is only slight. On the other hand, in the multilayer capacitor according to the present embodiment, the value of ESR is very small in a high frequency region, as represented by the solid line A. Accordingly, it is found that the Q factor can be improved by 30% or more. In the present invention, therefore, it is necessary that the width d of the slit satisfies $d \geq 2t$.

As described in the foregoing, the reason why the value of ESR is reduced in the present embodiment is that currents $I_1$ and $I_2$ flow in a branched manner in the inner electrode 57 to reduce eddy currents $J_1$ and $J_2$ produced by the currents.

Figure 5A:
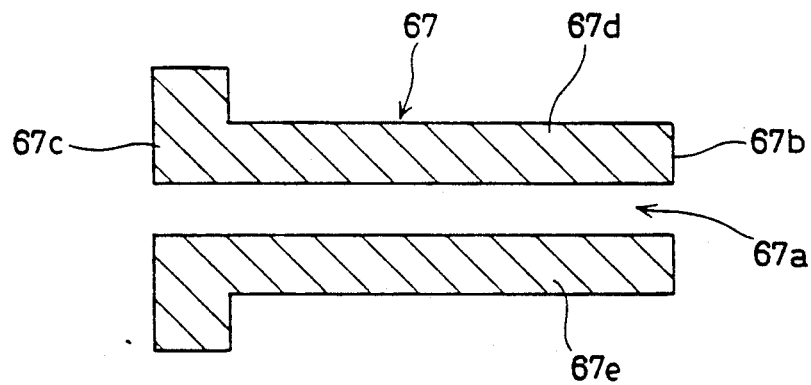
FIGS. 5A to 5C are plan views for explaining modified examples of the shape of the slit.
Figure 5B:
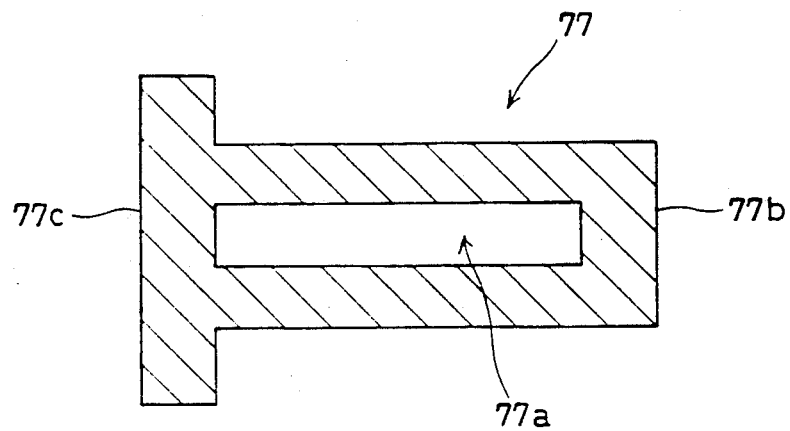

Meanwhile, the shape of the slit is not limited to the shape of the above described slits 57a to 59a. For example, as shown in FIG. 5A, in an inner electrode 67, a slit 67a extending in the direction in which a current flows may be formed so as to lead to a top end 67b of the inner electrode 67 and the other end 67c thereof. In this case, inner electrode portions 67d and 67e on both sides of the slit 67a are separated from each other by the slit 67a. In addition, as shown in FIG. 5B, a slit 77a may be formed so as not to lead to both ends 77b and 77c of an inner electrode 77 in the direction in which a current flows.

Figure 5C:
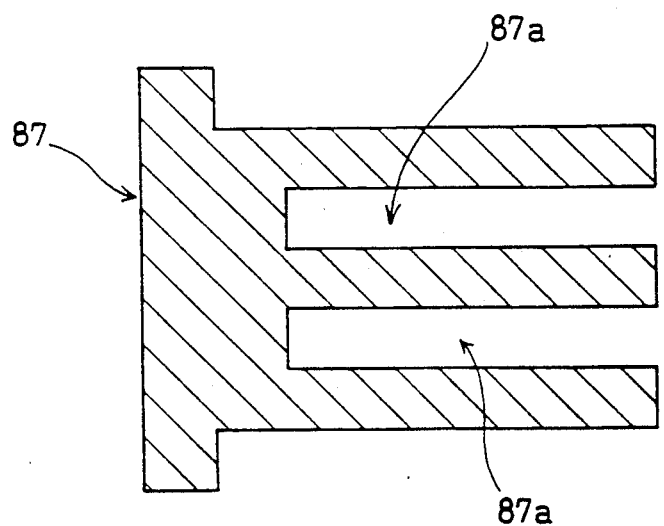
Figure 6:
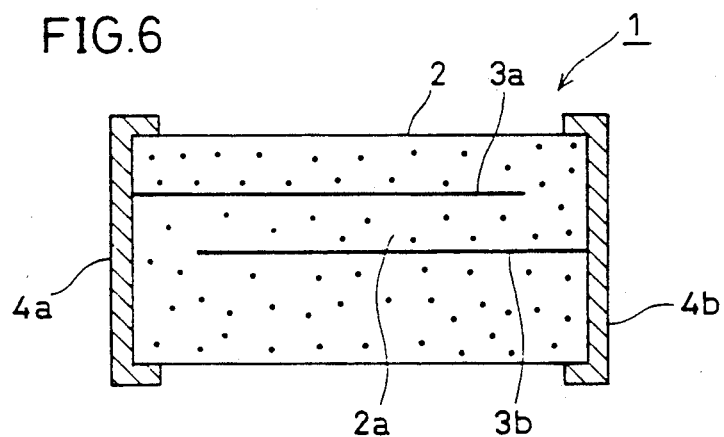
FIG. 6 is a sectional side elevation view showing a conventional general multilayer capacitor.
Figure 7:
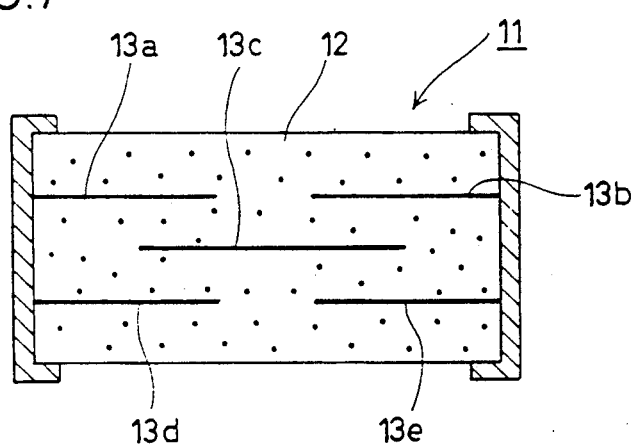
FIG. 7 is a sectional side elevation view showing one example of the conventional multilayer capacitor contrived to enhance Q characteristics.
Figure 8:
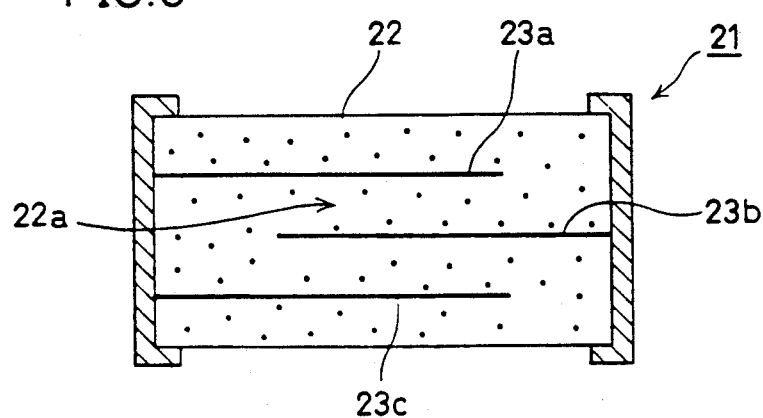
FIG. 8 is a sectional side elevation view showing another example of the conventional multilayer capacitor which has a structure for enhancing Q characteristics.
Figure 9:
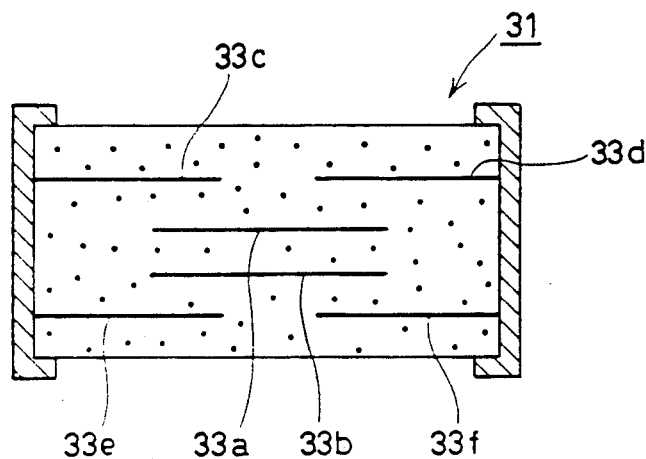
FIG. 9 is a sectional side elevation view showing still another example of the conventional multilayer capacitor which has a structure for enhancing Q characteristics.
Figure 10:
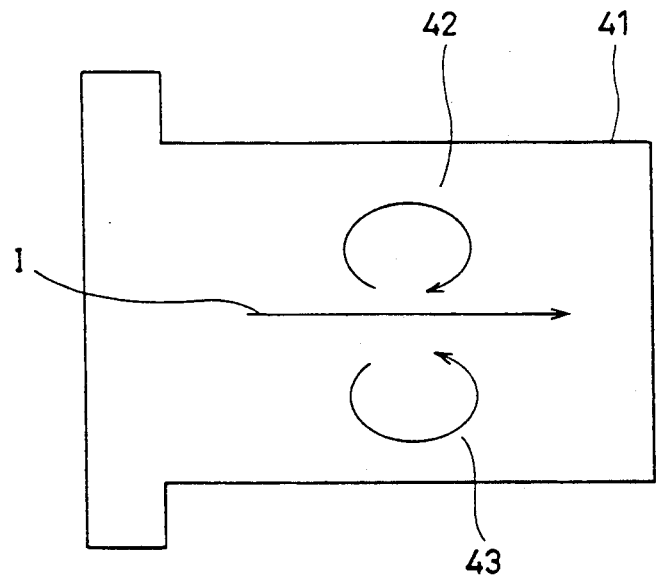
FIG. 10 is a typical plan view for explaining eddy currents produced in an inner electrode in the conventional multilayer capacitor.

Furthermore, as shown in FIG. 5C, one inner electrode 87 may be provided with a plurality of slits 87a.

Additionally, although as obvious from FIG. 1, all the inner electrodes 57 to 59 are respectively provided with the slits in the above described embodiment, only at least one inner electrode may be provided with the above described slit.

Moreover, the position where the slit is formed is not limited to the center of the inner electrode in the direction of width.

Furthermore, the present invention is characterized by the provision of the above described slit. Accordingly, the multilayer capacitor may have another structure for enhancing Q characteristics in such a range that the effect due to the provision of the slit is not arrested. More specifically, the present invention is also applicable to a multilayer capacitor in which the number of inner electrodes is increased and at least one inner electrode is of double electrode construction.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A multilayer capacitor comprising:
   a dielectric body;
   a plurality of inner electrodes arranged so as to be partially overlapped with each other while being separated by dielectric layers in said dielectric body; and
   outer electrodes formed on a pair of end surfaces of said dielectric body and electrically connected to predetermined inner electrodes;
   at least one of said plurality of inner electrodes being provided with a slit extending in the direction of a current flowing in the inner electrode and having a width which is two times or more as large as the thickness of the dielectric layer which is in contact with the inner electrode.

2. The multilayer capacitor according to claim 1, wherein said slit is formed from a top end of the inner electrode so as not to lead to an end on the opposite side of the top end in the direction of the current flowing in the inner electrode.

3. The multilayer capacitor according to claim 1, wherein said slit is formed so as to lead to both ends of the inner electrode in the direction of the current flowing in the inner electrode, thereby to separate inner electrode portions on both sides of the slit.

4. The multilayer capacitor according to claim 1, wherein said slit is formed so as not to lead to both ends of the inner electrode in the direction of the current flowing in the inner electrode.

5. The multilayer capacitor according to claim 1, wherein said slit is formed in a central part of the inner electrode in the direction of width.

6. The multilayer capacitor according to claim 1, wherein one inner electrode is provided with a plurality of slits.

7. The multilayer capacitor according to claim 1, wherein said dielectric body is a ceramic sintered body.

* * * * *